(12) United States Patent
Okawa et al.

(10) Patent No.: US 9,507,242 B2
(45) Date of Patent: Nov. 29, 2016

(54) IMAGING DEVICE, CAMERA SYSTEM, AND CONTROL METHOD FOR IMAGING DEVICE

(71) Applicant: Olympus Corporation, Hachioji-shi, Tokyo (JP)

(72) Inventors: Satoshi Okawa, Hachioji (JP); Tetsuya Hayashi, Hino (JP)

(73) Assignee: Olympus Corporation, Tokyo (JP)

( * ) Notice: Subject to any disclaimer, the term of this patent is extended or adjusted under 35 U.S.C. 154(b) by 83 days.

(21) Appl. No.: 14/458,650

(22) Filed: Aug. 13, 2014

(65) Prior Publication Data

US 2015/0062717 A1    Mar. 5, 2015

(30) Foreign Application Priority Data

Aug. 27, 2013    (JP) .................................. 2013-175288

(51) Int. Cl.
| | | |
|---|---|---|
| G03B 13/36 | (2006.01) | |
| G02B 7/10 | (2006.01) | |
| G03B 3/10 | (2006.01) | |
| G03B 5/00 | (2006.01) | |

(52) U.S. Cl.
CPC ............. *G03B 13/36* (2013.01); *G02B 7/102* (2013.01); *G03B 3/10* (2013.01); *G03B 5/00* (2013.01); *G03B 2205/0046* (2013.01)

(58) Field of Classification Search
CPC .................................................. H04N 5/23296
See application file for complete search history.

(56) References Cited

U.S. PATENT DOCUMENTS

| | | | |
|---|---|---|---|
| 5,315,340 A * | 5/1994 | Hirasawa ........... | H04N 5/23212 348/E5.045 |
| 2013/0120645 A1* | 5/2013 | Uenishi .............. | H04N 5/23212 348/353 |
| 2014/0341553 A1* | 11/2014 | Kikuchi ................. | G02B 7/282 396/81 |

FOREIGN PATENT DOCUMENTS

JP    2012-255910    12/2012

* cited by examiner

*Primary Examiner* — WB Perkey
*Assistant Examiner* — Noam Reisner
(74) *Attorney, Agent, or Firm* — John C. Pokotylo; Straub & Pokotylo

(57) ABSTRACT

An imaging device, comprising an interchangeable lens having a photographing optical system whose focal length can be varied, comprises a zoom position detection section for detecting a zoom position in accordance with focal length of the imaging optical system, and a lens control section for controlling movement of a focus lens contained in the imaging optical system, wherein the lens control section corrects position that the focus lens is moved to in accordance with the zoom position before movement of the focus lens and zoom position during movement of the focus lens.

18 Claims, 12 Drawing Sheets

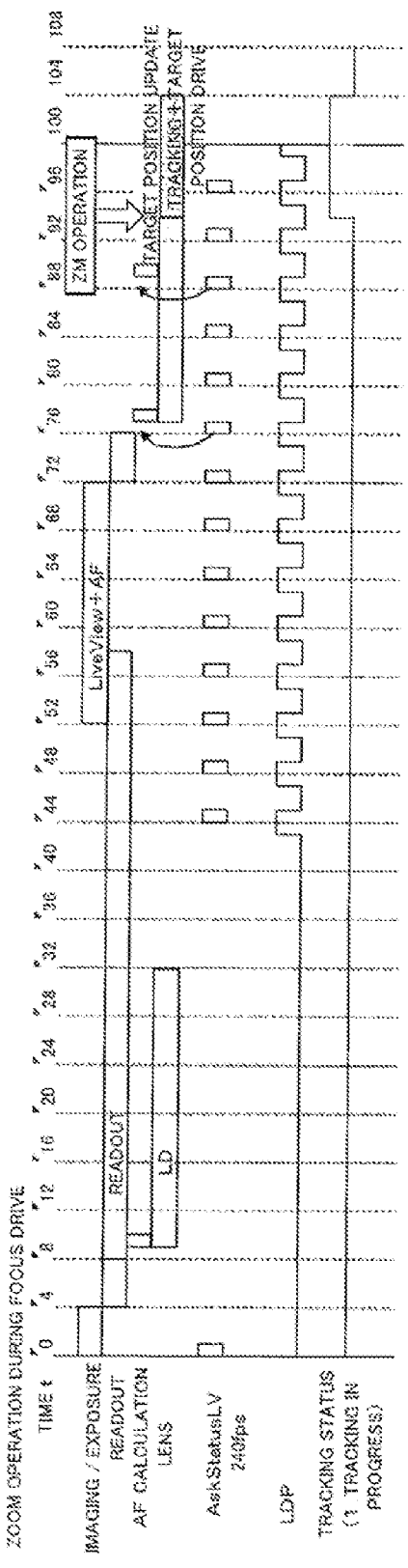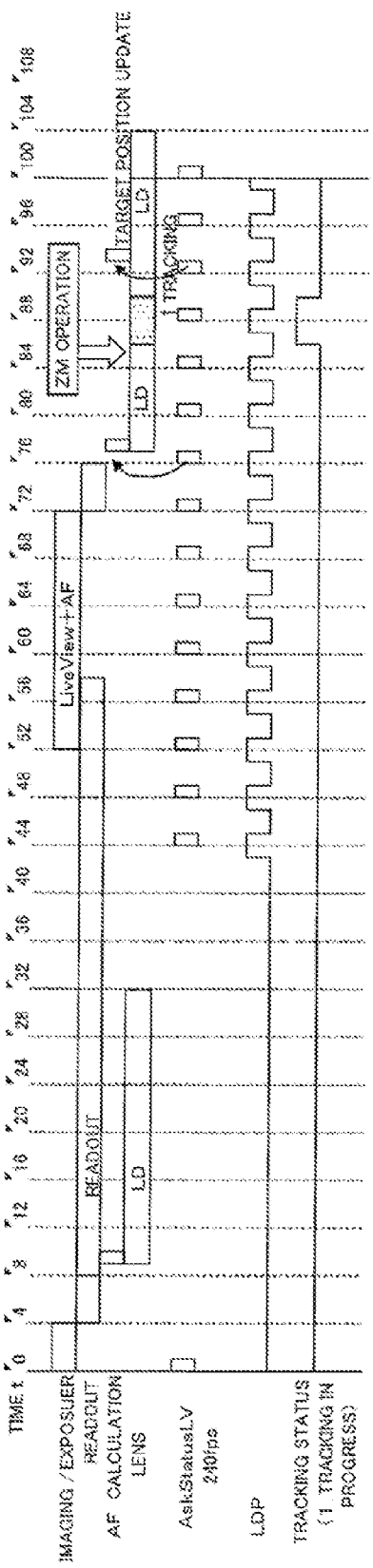

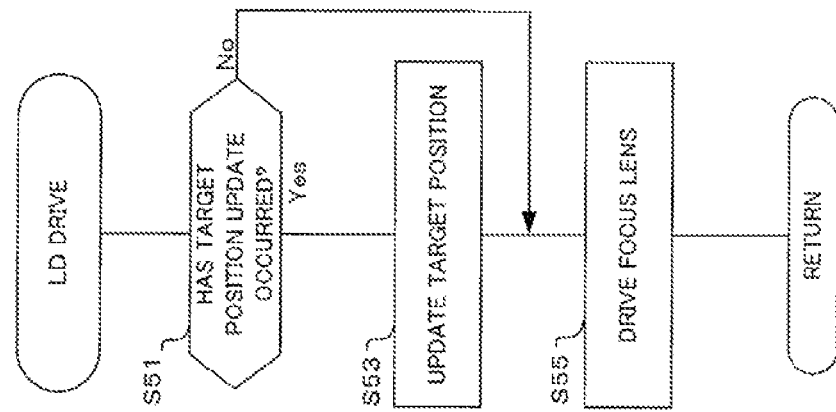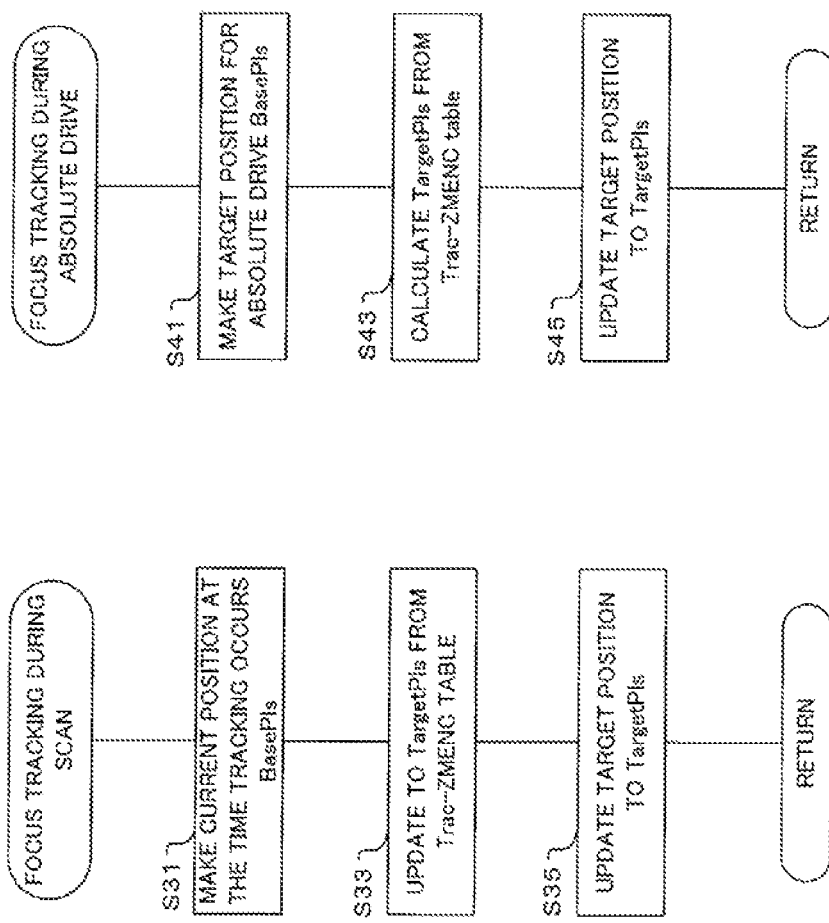

IMAGING DEVICE, CAMERA SYSTEM, AND CONTROL METHOD FOR IMAGING DEVICE

Benefit is claimed, under 35 U.S.C. §119, to the filing date of prior Japanese Patent Application No. 2013-175288 filed on Aug. 27, 2013. This application is expressly incorporated herein by reference. The scope of the present invention is not limited to any requirements of the specific embodiments described in the application.

BACKGROUND OF THE INVENTION

1. Field of the Invention

The present invention relates to an imaging device having an imaging optical system whose focal length can be varied, and having a drive section for respectively driving a plurality of lens groups within this imaging optical system, to a camera system, and to a control method for an imaging device.

2. Description of the Related Art

An imaging lens capable of respectively independently driving focus lens groups and zoom lens groups is known. With this type of imaging lens, if a zoom operation is carried out while an AF operation is in progress, the AF operation is temporarily interrupted and tracking (specifically, positional adjustment of a focus lens group in accordance with the zoom operation) is carried out (refer, for example, to Japanese patent laid open number 2012-255910 (hereafter referred to as patent publication 1)).

SUMMARY OF THE INVENTION

An object of the present invention is to provide an imaging device capable of carrying out a high-speed AF operation even if a zoom operation is performed while AF operation is in progress, and to provide a camera system and control method for an imaging device.

An imaging device of the present invention has an interchangeable lens having an imaging optical system whose focal length can be varied, and comprises: a zoom position detection section for detecting a zoom position in accordance with focal length of the imaging optical system, and a lens control section for controlling movement of a focus lens contained in the imaging optical system, wherein the lens control section corrects position that the focus lens is moved to in accordance with the zoom position before movement of the focus lens and zoom position during movement of the focus lens.

An imaging device of the present invention has an interchangeable lens having an imaging optical system whose focal length can be varied, and comprises: an imaging section for imaging light flux that has passed through the imaging optical system and outputting image signals, a zoom position detection section for detecting zoom position in accordance with focal length of the imaging optical system, a lens control section for controlling movement of a focus lens contained in the imaging optical system, and an AF control section for carrying out a scan operation in order to detect peak position of contrast based on image signals output by the imaging section, while moving the focus lens using the lens control section, wherein the lens control section halts the scan operation in the event that variation in the zoom position has been detected during execution of the scan operation in accordance with an instruction from the AF control section, calculates a corrected position of the focus lens based on the focus lens position at the time of detection of variation in zoom position, and zoom position detected during movement of the focus lens, moves the focus lens to the corrected position, and, after this movement has been completed, recommences the scan operation.

A camera system of the present invention has an interchangeable lens having an imaging optical system whose focal length can be varied, and a camera body capable of being attached to and detached from the interchangeable lens, the interchangeable lens comprising a zoom position detection section for detecting zoom position in accordance with focal length of the imaging optical system, and a lens control section for controlling movement of a focus lens contained in the imaging optical system, and the camera body comprising a body control section for carrying out communication with the lens control section, and a zoom position storage section for storing the zoom position that has been transmitted by the lens control section and received by the body control section, and wherein the body control section transmits a stored zoom position that is stored in the zoom position storage section to the lens control section, and the lens control section corrects the position to which the focus lens is moved in accordance with the stored zoom position and zoom position during movement of the focus lens.

A control method of the present invention, for an imaging device including a focus lens and having an imaging optical system whose focal length can be varied, comprises halting execution of first processing to move the focus lens to a first position, during execution of the first processing, when variation in the focal length is detected, and executing second processing to calculate a second position of the focus lens based on focal length detected during movement of the focus lens to the first position, and move the focus lens to the second position.

BRIEF DESCRIPTION OF THE DRAWINGS

FIG. 9A and FIG. 9B are timing charts for when a zoom operation is carried out while focus drive or scanning is in progress, in the camera of one embodiment of the present invention.

FIG. 11 is a flowchart showing a focus tracking operation while scanning is in progress, for the camera of one embodiment of the present invention.

FIG. 12 is a flowchart showing a focus tracking operation while absolute drive is in progress, for the camera of one embodiment of the present invention.

FIG. 13 is a flowchart showing operation of LD drive in the camera of one embodiment of the present invention.

DETAILED DESCRIPTION OF THE PREFERRED EMBODIMENTS

Figure 1:
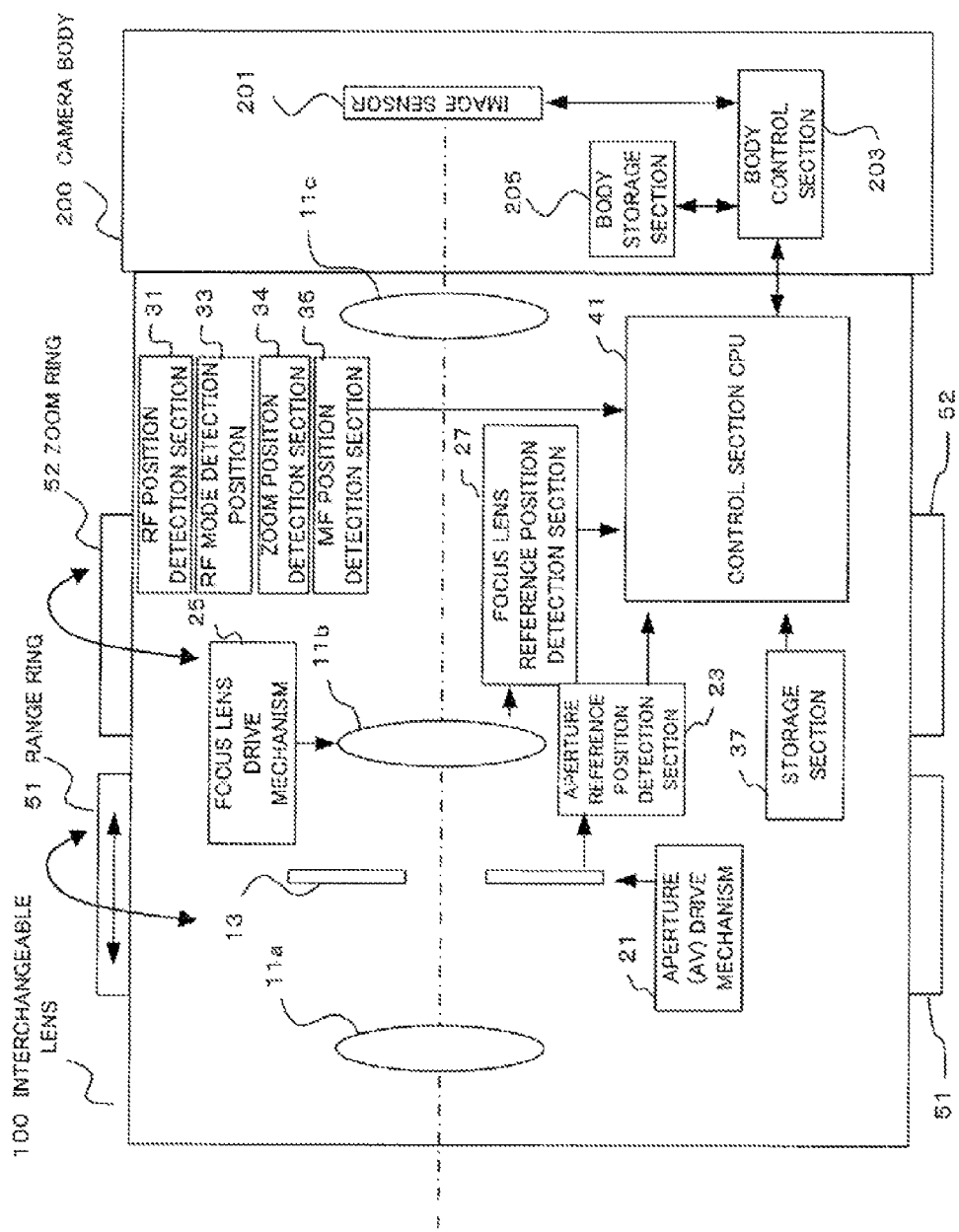
FIG. 1 is a block diagram showing the structure of a camera of one embodiment of the present invention.
Figure 2:
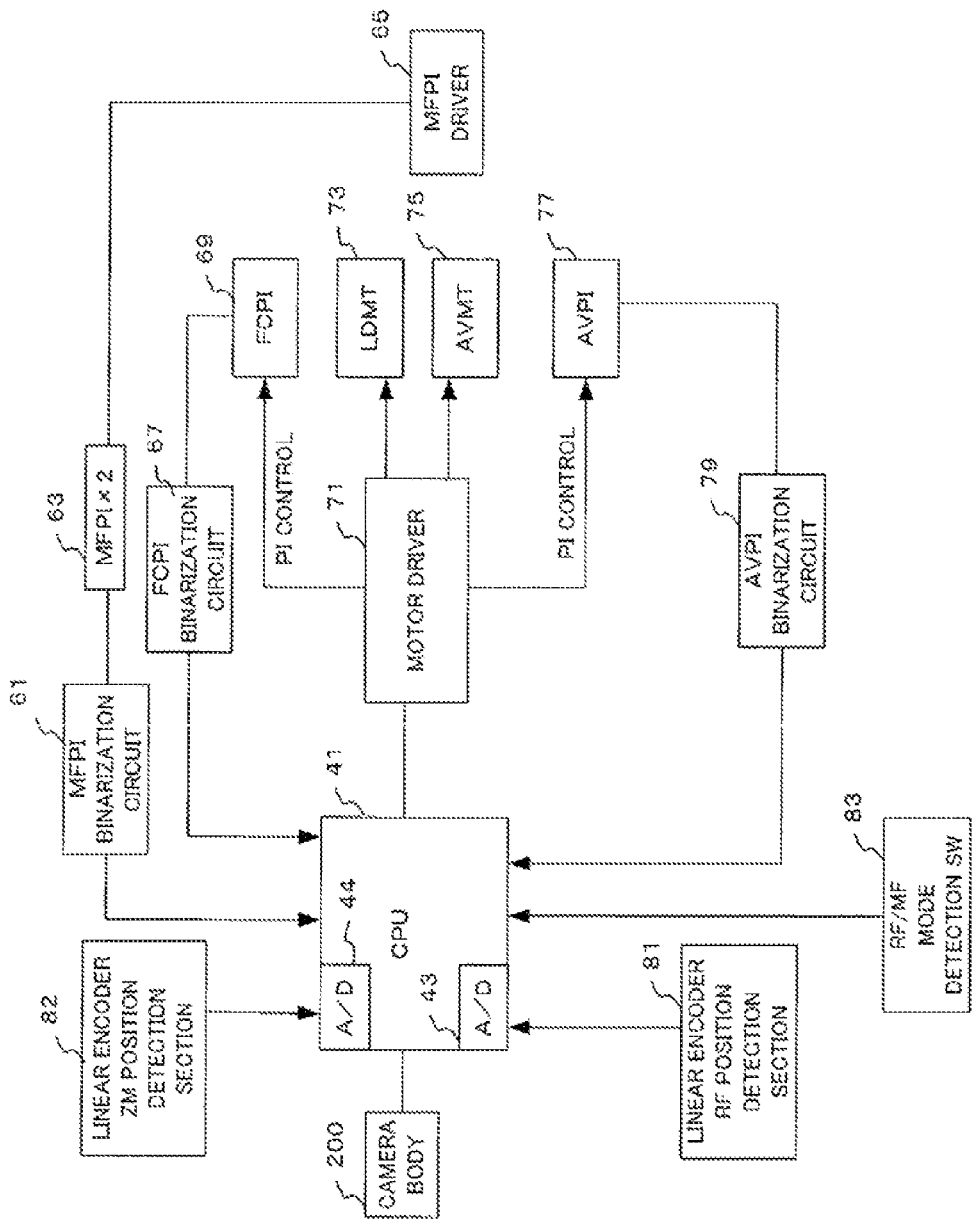
FIG. 2 is a block diagram mainly showing the electrical structure of a camera of one embodiment of the present invention.

A preferred one embodiment using a camera to which the present invention has been applied will be described in the following in accordance with the drawings. FIG. 1 is a block diagram showing the structure of a camera of one embodiment of the present invention, and FIG. 2 is a block diagram mainly showing the electrical structure of this camera. This camera is comprised of an interchangeable lens 100 having an imaging optical system whose focal length can be varied, and a camera body 200. It is also possible, however, for the lens barrel and the camera body to be integrally formed.

A photographing lens 11 made up of lenses 11a to 11c is provided within the interchangeable lens 100. A subject image is formed by the photographing lens 11. The focus lens 11b is a lens for focus adjustment, and is capable of being moved in the optical axis direction by a focus lens drive mechanism 25. The focus lens drive mechanism 25 has a focus lens actuator and a focus lens drive circuit. The focus lens 11b is therefore provided inside the lens barrel, and functions as a focus adjustment lens capable of movement in the optical axis direction. Also, some of the lenses 11a-11c are zoom lenses for varying focal length. Zoom lens groups are therefore provided inside the interchangeable lens 100.

Also, a focus lens reference position detection section 27 outputs a detection signal to the CPU 41 if the focus lens 11b reaches a reference position. With this embodiment, a photo interrupter (PI) is used in the reference position detection (refer to the FCPI 69 in FIG. 2), but it is also possible to use another sensor besides the photo interrupter, such as a photo reflector, for example. In this embodiment, position detection of the focus lens 11b involves, if a reference position is reached, making that position a reference and then measuring a relative movement amount for the focus lens actuator (stepping motor) using a number of drive pulses, to obtain a position of the focus lens 11b from the reference position.

An aperture 13 is arranged between the lens 11a and the lens 11b. The aperture 13 has on opening size varied by an aperture drive mechanism 21, to vary an amount of subject light that passes through the photographing lens 11. The aperture drive mechanism 21 has an aperture actuator and an aperture drive circuit etc. A stepping motor is used as the actuator, and fine control is carried out using micro step drive. The aperture 13 may also be arranged at a position other than between the lens 11a and the lens 11b.

An aperture reference position detection section 23 outputs a detection signal to the CPU 41 if the aperture opening size reaches a reference position. A reference position for aperture position is acquired by the reference position detection section 23, and aperture position is controlled by relative position detection. Relative position detection involves detection using a number of pulses applied to a stepping motor, while reference position detection involves detection using a photo interrupter (PI) (refer to the AVPI 77 in FIG. 2).

A range ring 51 is arranged around the outside of the interchangeable lens 100. The range ring 51 is capable of being turned around the outside of the interchangeable lens 100, and also slides within a specified range in the optical axis direction of the photographing lens 11. If this range ring 51 is slid towards the subject side it is set to a non-RF (non-range focus) (sometimes also referred to as MF (manual focus)) position, and is set to an RF (range focus) position if it is slid towards the body side. Switching between RF mode and non-RF mode (MF mode) is carried out by sliding the range ring 51. Detection of this mode is carried out by an RF mode detection section 33. Also, the range ring 51 is constructed to be capable of being turned between a close-up end and an infinity end.

Non-RF mode is a mode for carrying out focusing in accordance with turning direction and turning amount of the range ring 51 if the user turns the range ring 51, while RF mode is a mode for focusing to a distance that has been designated by the range ring 51. Specifically, non-RF mode and MF mode are both manual focus, but with non-RF mode designation of a relative distance is carried out by the range ring 51, and differs from RE mode where an absolute distance is designated.

If MF mode is set by sliding the range ring 51, light shielding blades at an inner side of the range ring 51 turn as one with turning of the range ring 51. This rotation of the light shielding blades is counted by the photo interrupter (PI) (refer to the MFPI 63 in FIG. 2), and the focus lens 11b is driven in accordance with this count value. Rotation direction and rotation amount of the range ring 51 may also be detected by a sensor other than a photo interrupter.

If RF mode has been set by sliding the range ring 51, then if the range ring 51 is turned, that turning position is detected by the RF position detection section 31. The RF position detection section 31 detects absolute position for rotation position of the range ring 51. The focus lens drive mechanism 25 drives the focus lens 11b to an imaging distance corresponding to the rotation position of the range ring 51, in accordance with control signals from the CPU 41.

The RF mode detection section 33 detects which of the non-RF position (MF position) or the RF position the range ring 51 has been set to, based on output of an RF/MF mode detection switch 83 (refer to FIG. 2).

An MF position detection section 35 detects rotation direction and rotation amount of the range ring 51, when the range ring 51 has been set to the non-RF position (MF position). Manual focus is carried out based on the detection result of this MF position detection section 35.

A zoom ring 52 is arranged around the outside of the interchangeable lens 100, more to the body side than the range ring 51, and is capable of being turned around the outside of the interchangeable lens 100. If the user manually turns the zoom ring 52, zooming can be carried out.

A zoom position detection section 34 detects an absolute value for rotation position of the zoom ring 52, and outputs to the CPU 41. As will be described later, the zoom position detection section 34 has a linear encoder ZM position detection section 82, output of this linear encoder position detection section 82 is subjected to AD conversion by an A/D converter 44 within the CPU 41, and this AD conversion value represents focal length. As a result, the zoom position detection section 34 is capable of detecting zoom position of zoom lens groups within the photographing lens 11 (imaging optical system), and functions as a zoom position detection section for detecting zoom position in accordance with focal length of the imaging optical system. With this embodiment, rotation position of the zoom ring 52 is detected, but this is not limited and position of a zoom lens group may be detected directly.

A storage section 37 is a rewritable nonvolatile memory, such as flash memory etc., and stores programs used by the CPU 41, various information such as optical data of the interchangeable lens, various adjustment values, and various parameters etc. The storage section 37 stores a first relationship between rotational angle of a ring member and distance, and a second relationship between position of the focus adjustment lens in the optical axis direction and distance, and with this embodiment the first and second relationships are stored in table form. The storage section 37 functions as a storage section for storing tracking information (refer to L in FIG. 5) representing a relationship between zoom position detected by the zoom position detection section and the position of the focus lens 11b focusing at a specified distance.

In accordance with a program stored in the previously described storage section 37, the CPU 41, which is a control section, carries out control within the interchangeable lens 100 in accordance with control instructions from the camera body 200. The CPU 41 is input with detection signals from the focus lens reference position detection section 27, the RF position detection section 31, the RF mode detection section 33, the zoom position detection section 34 and the MF position detection section 35, and outputs control signals to the focus lens drive mechanism 25 and the aperture drive mechanism 21. The CPU 41 functions as a lens communication section for carrying out communication with the camera body 200, and zoom position that has been detected by the zoom position detection section 34 is transmitted from the CPU 41 to the body control section 203 within the camera body 200.

The CPU 41 also functions as a lens control section for controlling movement of a focus lens 11b contained in the imaging optical system via the focus lens drive mechanism 25. The CPU 41 also functions as a lens control section for correcting a position that the focus lens is moved to in accordance with zoom position before movement of the focus lens 11b, and zoom position during movement of the focus lens (this will be described in detail later using FIG. 3 to FIG. 5). Specifically, for example, there is processing at the time of focus tracking during absolute drive, as shown in FIG. 5 which will be described later, and at the time of a zoom operation during focus drive as shown in S7, S9, S13 and S15 in FIG. 10, and in FIG. 12 and FIG. 13. Also, in FIG. 5 a first position corresponds to position O3, a second position corresponds to position O5, and a zoom position detected during movement of the focus lens to the first position corresponds to Z2.

Figure 3:
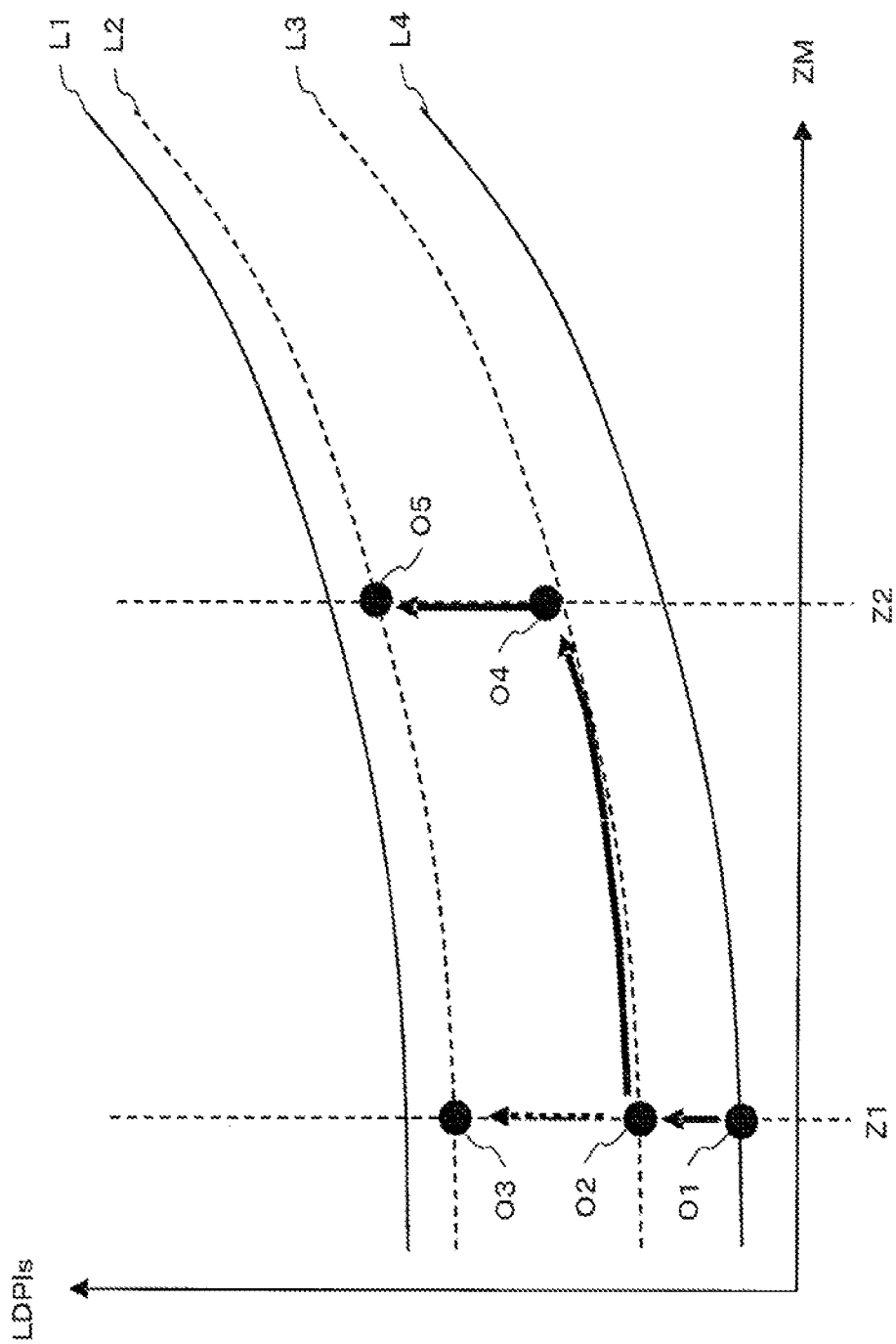
FIG. 3 is a drawing for describing an overview of a focus tracking operation during scan drive of the camera of one embodiment of the present operation.
Figure 4:
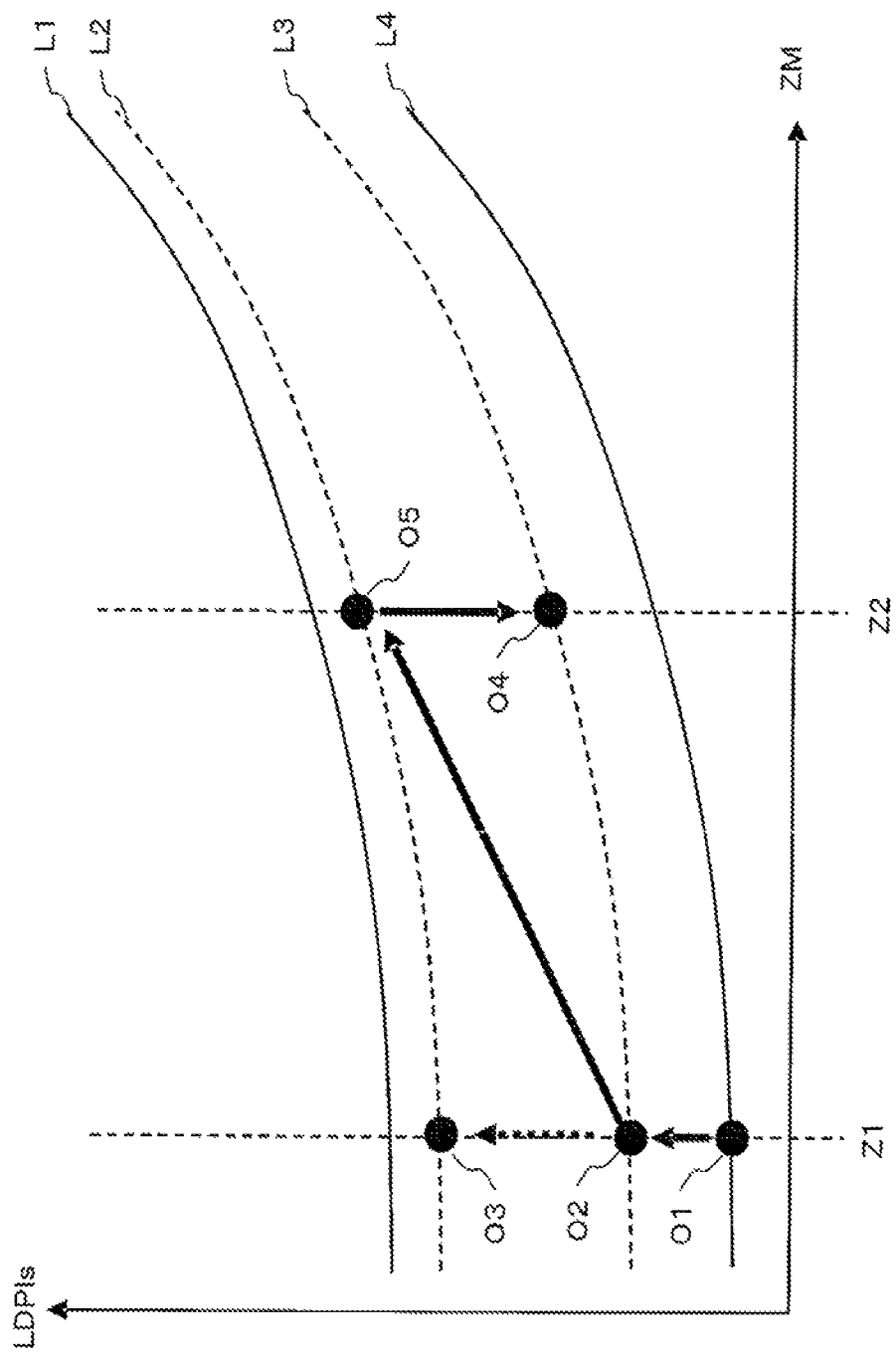
FIG. 4 is a drawing for describing an overview of a modified example of a focus tracking operation during scan drive of the camera of one embodiment of the present operation.
Figure 5:
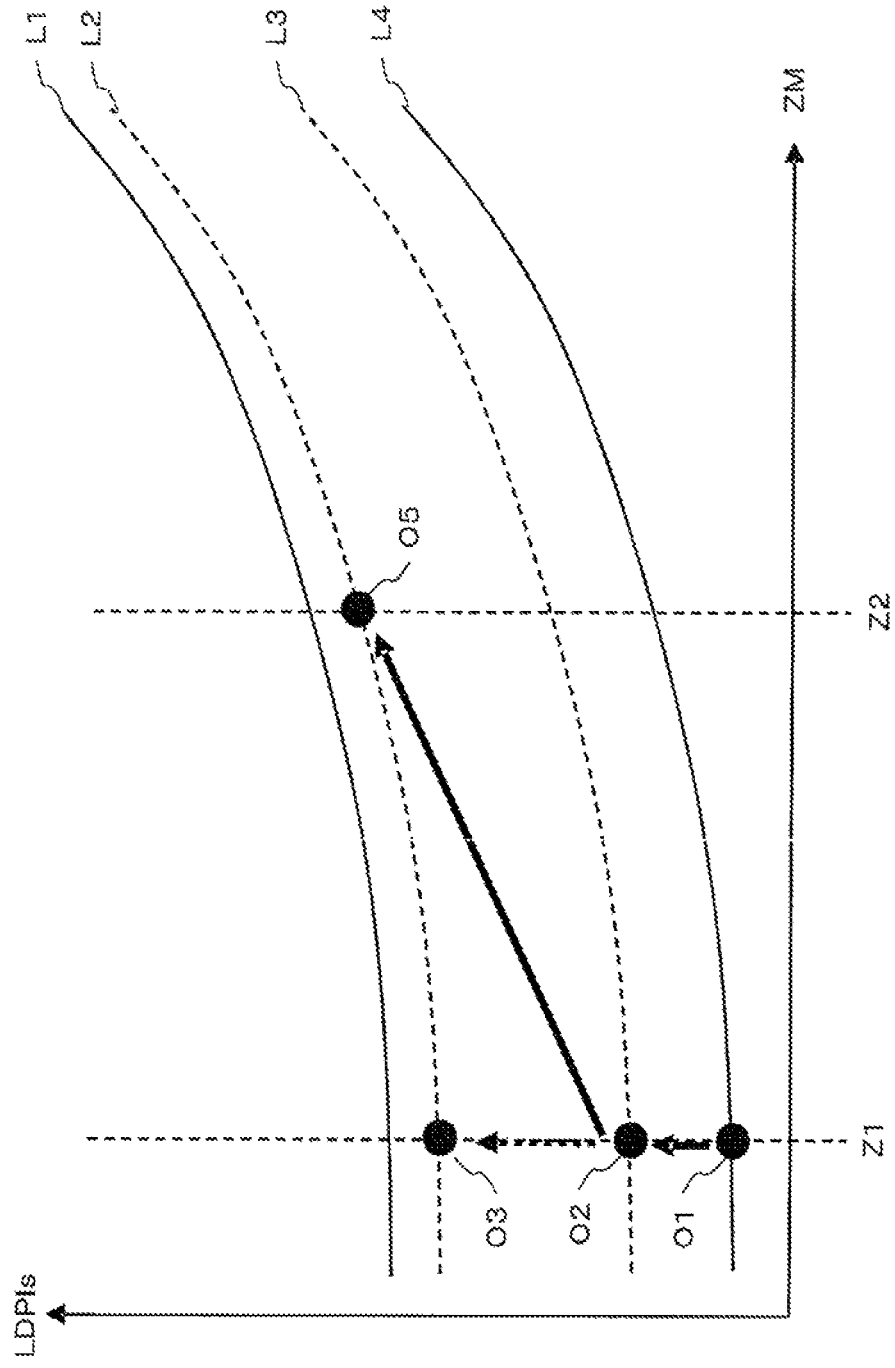
FIG. 5 is a drawing for describing an overview of a focus tracking operation during absolute drive in the camera of one embodiment of the present operation.

Also, the CPU 41 is capable of moving the focus lens 11b at a plurality of speeds, and also functions as a lens control section for moving the focus lens at a maximum speed when a position the focus lens 11b is moved to is corrected in accordance with zoom position before moving the focus lens 11b and zoom position during movement of the focus lens 11b (refer to FIG. 3 and FIG. 4 for details). The CPU 41 also functions as a lens control section for correcting position for continuously moving the focus lens without stopping, when position for driving the focus lens is corrected (refer to FIG. 3 and FIG. 4 for details). CPU 41 also functions as a lens control section for calculating second position based on tracking information that has been stored in the storage section (refer to L in FIG. 5, for example).

The CPU 41 also functions as an AF control section for carrying out a scan operation in order to detect peak position of a contrast value (AF evaluation value) based on image signals output from the imaging section, while moving the focus lens, in cooperation with the focus lens drive mechanism 25 and a body control section 203, which will be described later. During execution of a scan operation, this AF control section halts the scan operation when a position the focus lens 11b is moved to by the control section is corrected, and recommences the scan operation after the focus lens 11b has been moved to the corrected position and movement is completed (refer to FIG. 3 for details). The CPU 41 also corrects position the focus lens is moved to in accordance with stored zoom position transmitted from the body control section 203 and zoom position during movement of the focus lens 11b (refer to FIG. 8 for details).

Figure 10:
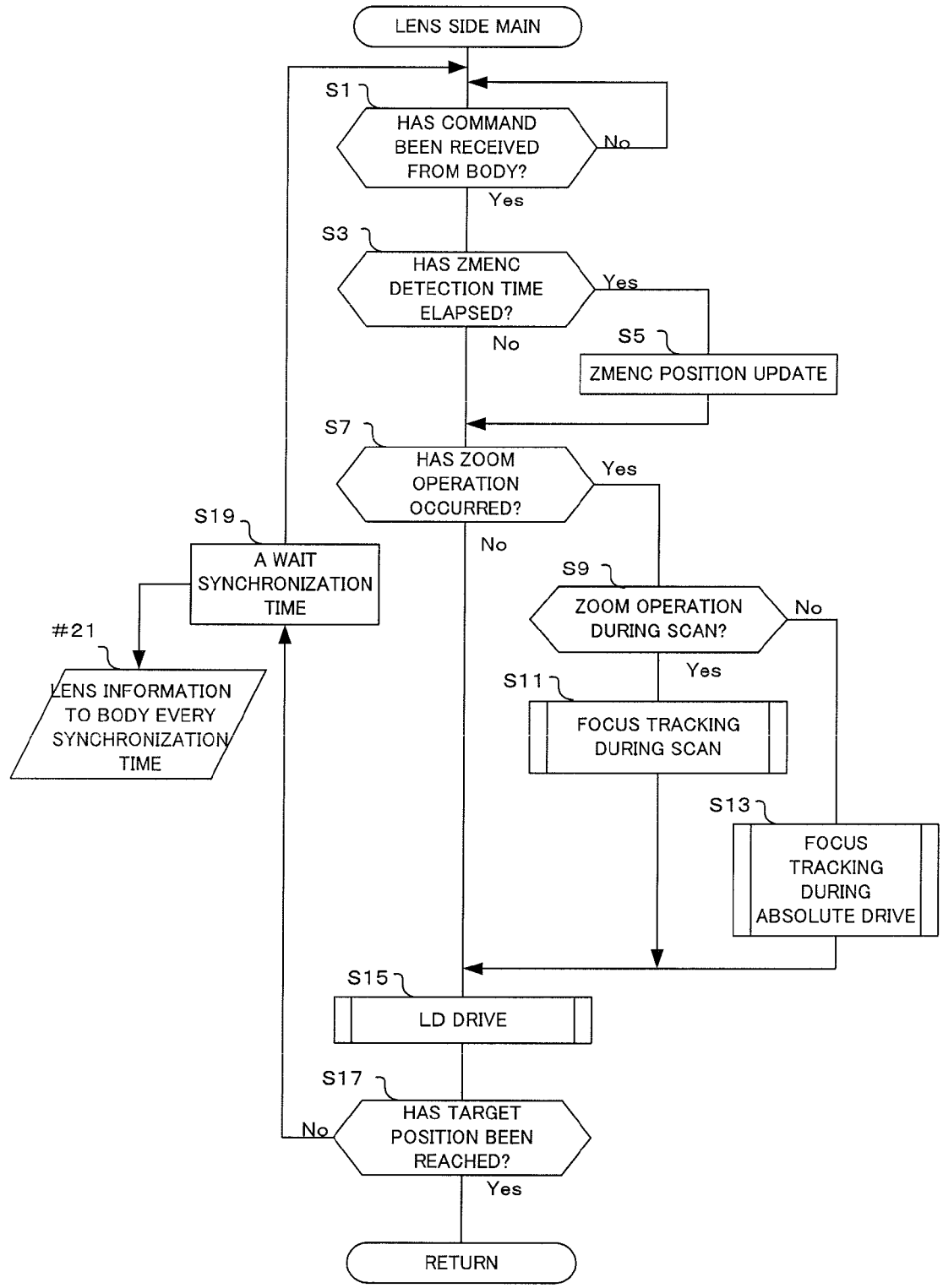
FIG. 10 is a flowchart showing main operation at the lens side of the camera of one embodiment of the present invention.

The CPU 41 also functions as a lens control section, for stopping a scan operation when variation in zoom position has been detected during execution of a scan operation in accordance with an instruction from the AF control section, calculating a corrected position for the focus lens based on focus lens position at the time that variation in zoom position was detected, and zoom position detected during movement of the focus lens, moving the focus lens to the corrected position, and recommencing the scan operation after this movement has been completed (this will be described in detail later using FIG. 3, S7, S9, S11 and S15 in FIG. 10, FIG. 11 and FIG. 13 etc.). Specifically, for example, with FIG. 3, corrected position corresponds to position O4, and focus lens position at the time that variation in zoom position was detected corresponds to position O2.

The CPU 41 also functions as a lens control section for carrying out an operation to move the focus lens to a first target position using a scan operation, calculating a second target position based on zoom position detected during movement of the focus lens, the first target position and tracking information, and moving the focus lens to the second target position if the scan operation is recommenced (refer to FIG. 3 for details). Specifically, in FIG. 3, for example, the first target position corresponds to position O3, the second target position corresponds to position O5, and tracking information corresponds to L2. The CPU 41 also functions as a lens control section for continuously moving the focus lens without halting movement, when the scan operation is recommenced An image sensor 201, body control section 203 and a body storage section 205 are arranged inside the camera body 200. The image sensor 201 is arranged close to an image forming position of the photographing lens 11, a subject image formed by the photographing lens 11 is photoelectrically converted, and image data is output to the body control section 203 etc. This image sensor 201 functions as an imaging section for imaging light flux that has passed through the imaging optical system and outputting image signals, The body control section 203 includes a CPU for control etc., and controls the camera body 200 in accordance with a body control program stored in the body storage section 205, and also carries out communication with the CPU 41 within the interchangeable lens 100 (specifically carries out control with the lens control section), and carries out overall control of the camera system constituted by the camera body 200 and the interchangeable lens 100.

The body storage section 205 has a nonvolatile memory such as flash memory, and stores various adjustment values as well as the previously described body control program. The body storage section 205 also functions as a zoom position storage section for storing a zoom position transmitted from the CPU 41 (lens control section) that has been received by the body control section 203. The body control section 203 transmits a zoom position stored in the body storage section 205 to the lens control section (CPU 41).

Next, the detailed electrical structure will be described using FIG. 2. As described previously, the CPU 41 is capable of communication with the body control section 203 within the camera body 200. The CPU 41 is also connected to a motor driver 71, and this motor driver 71 carries out drive of an FCPI 69, LDMT 73, AVMT 75 and AVPI 77.

The FCPI 69 is a photo interrupter for reference position detection of the focus lens 11b, and output of this FCPI 69 is connected to an FCPI binarization circuit 67. The FCPI 69 and the FCPI binarization circuit 67 correspond to the previously described focus lens reference position detection section 27.

The LDMT 73 is an LD motor (lens drive motor), and functions as the previously described focus actuator within the focus lens drive mechanism 25. In this embodiment a stepping motor is adopted as the LD motor, but it is also possible to use another motor such as a voice coil motor, for example. The AVMT 75 is an aperture motor, and functions as the previously described aperture actuator within the aperture drive mechanism 21.

The AVPI 77 is a photo interrupter for reference position detection of the aperture 13, and output of this AVPI 77 is connected to an AVPI binarization circuit 79. The AVPI 77 and AVPI binarization circuit 79 correspond to the previously described aperture reference position detection section 23.

An MFPI driver 65 is a driver for the MFPI 63 for detecting turning of the range ring 51 in a case where the range ring 51 has been slid to the MF position. The MFPI 63 is provided at two locations along the turning direction of the light shielding blades. Output of this MFPI 63 is connected to an MFPI binarization circuit 61, and binarized by the MFPI binarization circuit 61. The MFPI binarization circuit 61, MFPI 63, and MFPI driver 65 correspond to the previously described MF position detection section 35.

A linear encoder RF position detection section 81 is a linear encoder for detecting absolute position of the range ring 51 in a rotational direction, in a case where the range ring 51 has been slid to the RF position. The linear encoder RF position detection section 81 is provided along a turning direction of the range ring 51, and outputs an analog signal in accordance with absolute position of the range ring 51 in the turning direction. An A/D converter 43 is provided within the CPU 41, which converts analog signals from the linear encoder RF position detection section 81 to digital signals. AD conversion values from the A/D converter 43 represent subject distance (absolute distance) that has been set by the user (sometimes referred to as RF linear encoder AD).

The linear encoder ZM position detection section 82 is an encoder for detecting absolute position of the zoom ring 52 in the rotation direction. The linear encoder ZM position detection section 82 is provided along the turning direction of the zoom ring 52, and outputs an analog signal in accordance with an absolute position of the zoom ring 52 in the turning direction. The A/D converter 44 is provided within the CPU 41, which converts analog signals from the linear encoder ZM position detection section 82 to digital signals. AD conversion values from the A/D converter 44 represent focal length that has been set by the user.

An RF/MF mode detection switch (SW) 83 is a switch for detecting whether the range ring 51 has been set to the RF mode or set to the MF mode (non-RF mode). This RF/MF mode detection SW 83 detects position of the range ring 51 in the optical axis direction, and is turned on or off when RF mode is set or when MF mode is set, and this on-off state is output to the CPU 41.

Next, an overview of the focus tracking operation of this embodiment will be described using FIG. 3 to FIG. 5. Between a conventional camera body and lens barrel, a lens position to be driven to (called LDPls) is transmitted from the body side to the lens side, but information representing at what focal length (called ZMENC) LDPls was calculated is not attached to this transmission. Also, at the time when the user carried out a zoom operation, lens drive (called LD) was carried out at the lens side so as to retain optical characteristics at this operated zoom position (this is called focus tracking using a zoom operation), but information for carrying out focus tracking within the lens was not received at the body side.

For this reason, if a zoom operation was carried out during continuous shooting, for example, there may be cases where a zoom position differs between the time of ranging and the time of actual exposure, and in this case an image would be out of focus because focus amount was not corrected by the extent of the zoom operation. Also, in the case where a focus drive (absolute drive) command was transmitted from the body to the lens side, if zoom position at the time of the detection when carrying out AF detection, and a zoom position at the time that the lens side received the command, are different, focus drive will be carried out to focus on the zoom position at the time of peak detection at the body side, and an image will be out of focus.

Further, regarding whether focus tracking is carried out within the lens, since there is no information at the camera body side, it was not known whether a reason for delay in drive completion response from the lens to the body was due to focus tracking or some other reason. The transmitted command was therefore canceled at the body side and it was impossible to determine whether the next operation should be transitioned to or tracking completion should be awaited and exposure transitioned to.

With this embodiment therefore, when a command is transmitted from the camera body side to the lens side, a command with focal length (ZMENC) attached is newly added. Also, a "lens state command" from the camera body side to request to be notified of the lens state at the lens side is responded to, and a tracking state flag from the lens side is added. Flag processing occurring as a result of the addition, and command receipt, are also carried out.

Focus tracking operations in this embodiment are mainly a tracking operation while scan drive is in progress and a tracking operation while absolute drive is in progress. Scan drive is an operation to drive the focus lens from one end to the other end at a constant speed when carrying out contrast AF. While carrying out this scan drive, a peak position of contrast value (AF evaluation value) of an image signal from the image sensor 201 is detected. Absolute drive is an operation to drive the focus lens 11b at the lens side in the direction of this peak position (absolute position), when the peak position of contrast value has been detected. Operation to drive to this peak position (focus position) is also called focus drive. Besides this, as absolute drive there are drive operations to focus at a specified distance (absolute position of the focus lens) etc.

A focus tracking operation while scan drive is in progress will be described using FIG. 3. In FIG. 3, the horizontal axis represents focal length (ZM), and the vertical axis represents position of the focus lens 11b (LDPls). Also, a solid line L1 represents focus lens position at the close-up end, and the solid line L4 represents focus lens position at the infinity end. Position O2 is current position of the focus lens during scan drive, and position O1 is an infinity end position for the current focal length, which is a position for commencing scan drive. Position O3 is a position calculated as a target position for scan drive that commenced from position O1. Specifically, it is a target position in the case where focal length has not changed during scan drive. The dashed line L3 in FIG. 3 represents position of the focus lens 11b constituting a focus position of current position O2 in the case where focal length has changed, and dashed line L2 represents position of the focus lens 11b constituting a focus position of target position O3 in the case where focal length has changed.

In FIG. 3, if the user carries out a zoom operation at current position O2 while scan drive is in progress, so as to change focal length from Z1 to Z2, a focus tracking operation is carried out. In this case, since it is desired to acquire a contrast value (AF evaluation value) movement for the focus-tracking portion is movement at the highest speed, and after that scan drive is restarted at an appropriate speed in order to acquire the contrast value. Specifically, a tracking reference position is position O2 at the time the zoom operation is commenced (focal length at this position is Trac-ZMENC (refer to FIG. 6)). Also, drive is at the highest speed from current position O2 to focus tracking target position O4, a tracking state flag is set only during this focus tracking drive, and after focus tracking drive is completed the tracking state flag is reset.

If tracking target position O4 for focal length Z2 is reached, scan drive is performed to the target position O5 at a normal scan speed without carrying out a temporary halt. The target position O5 is the same focus position as the focus position for the target position O3 for the initial scan drive (on dashed line L2), and is a position corresponding to focal length Z2. It is also possible to restart the scan drive after a temporary halt once the tracking target position O4 is reached.

FIG. 4 shows a modified example of the focus tracking operation of the embodiment that was shown in FIG. 3. With the example shown in FIG. 3, from current position O2 there was first movement to tracking target position O4 for which focus position is the same and only focal length is different, followed by scan drive to target position O5. However, with this modified example, position O5 having different focus position and focal length is made the tracking target position, and from current position O2 there is drive at the highest speed towards the position O5 that corresponds to focal length Z2 and has the same focus position as the initial scan target position O3, and once the position O5 is reached scan drive is carried out at a normal scan speed towards position O4.

Next, a focus tracking operation while absolute drive is in progress will be described using FIG. 5. If focal length is varied during absolute drive due to a zoom operation etc., there is drive at the highest speed towards "absolute position+tracking target position". Specifically, in FIG. 5, there is absolute drive towards target position O3, and if the current position is made O2, then a movement amount resulting from a change in focal length from Z1 to Z2 is added to a movement amount to the target absolute position O3 at the time the zoom operation was performed, to calculate a tracking target position O5. There is then drive towards the calculated target position O5 at maximum speed without a temporary halt.

Regarding the tracking state flag in the case of absolute drive focus tracking, the tracking state flag is kept set until the "absolute position+tracking target position" is reached. At the camera body side, since the fact that an absolute drive command has been generated (transmitted) is known, a lens drive (LD) completion time is predicted, and exposure commences after the predicted lens drive completion time.

Next, a tracking table of this embodiment will be described using FIG. 6. With this embodiment, a relationship between position of the focus lens 11b (shown as LDPls) corresponding to an arbitrary distance (reciprocal of distance (shown as 1/L)) is held in the table shown in FIG. 6. This table is stored in the storage section 37 within the interchangeable lens 100.

Figure 6:
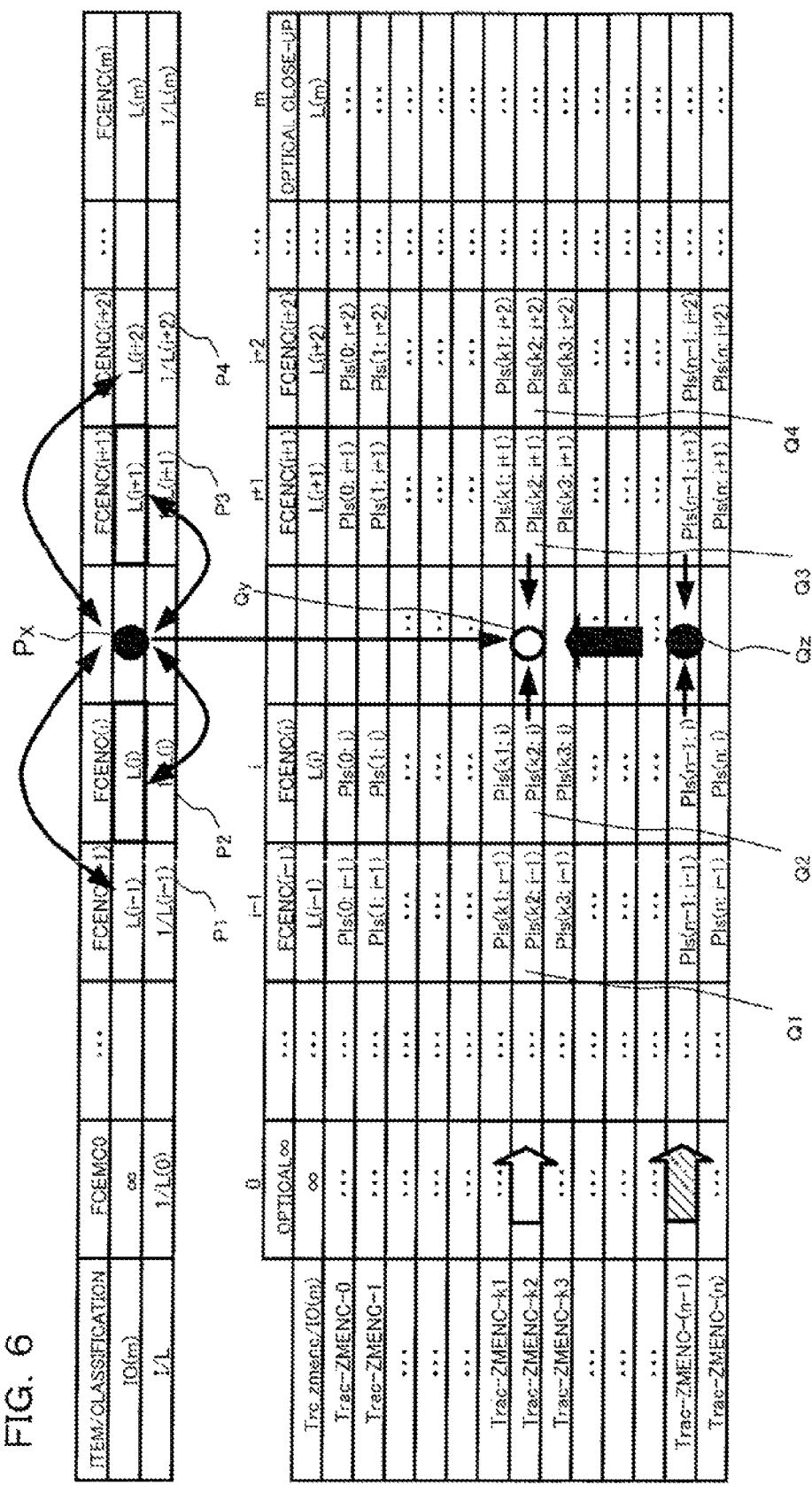
FIG. 6 is a drawing showing a table for calculating focus lens position (LDPls) in accordance with focal length from a reciprocal of subject distance (1/L).

Lens position (LDPls) for each focal length is shown in FIG. 6, and interpolation calculations in the table are also shown. The upper part of FIG. 6 shows reciprocal of distance (1/L) and the distance. For an input value Px (corresponding to position of the focus lens 11b) of reciprocal of distance (1/L), output LDPls (Qy in the drawing) is calculated by linear interpolation calculation using four lens positions LDPls (Q1-Q4 in the drawing) for reciprocals P1-P4 of four distances in front of and behind the input value Px.

The lower part of FIG. 6 has focal length in a vertical column (Trac-ZMENC-0 to Trac-ZMENC-n), and shows LDPls corresponding to the reciprocal of respective distances in each line. For example, in the case where focal length is Trac-ZMENC-k2, LDPls of distance L(i) is Pls(k2:i), and LDPls for distance L(i+1) is Pls(k2:i+1). LDPls corresponding to optical infinity and optically close up that optically vary in accordance with the focal length (Trac-ZMENC-0 to Trac-ZMENC-n) are also included.

With the example of interpolation processing shown in FIG. 6, a focal length set using the zoom ring 52 is Trac-ZMENC-k2. With this example, output LDPls (Qy) corresponding to input value Px is obtained using Pls (k2:i−1), Pls (k2:1), Pls(k2:1+1) and Pls(k2:i+2), which are LDPls associated with FCENC(i−1) to FCENC(i+2) (data corresponding to focal lengths L(i−1), L(i), L(i+1) and L(i+2)).

Accordingly, with this embodiment, LDPls corresponding to input data for reciprocal of distance (1/L) is calculated using the following procedure.

(1) An FCENC region containing reciprocal of distance (1/L) input data is defined, and FCENC regions adjacent to both sides of this region and 1/L data corresponding to these regions is obtained.
(2) LDPls corresponding to FCENC regions adjacent to both sides of the FCENC region in (1) above are obtained from current zoom position and the Trac-ZMENC table.
(3) LDPls corresponding to 1/L input data is obtained from the data (1) and (2) above, using a linear interpolation equation.

Figure 7:
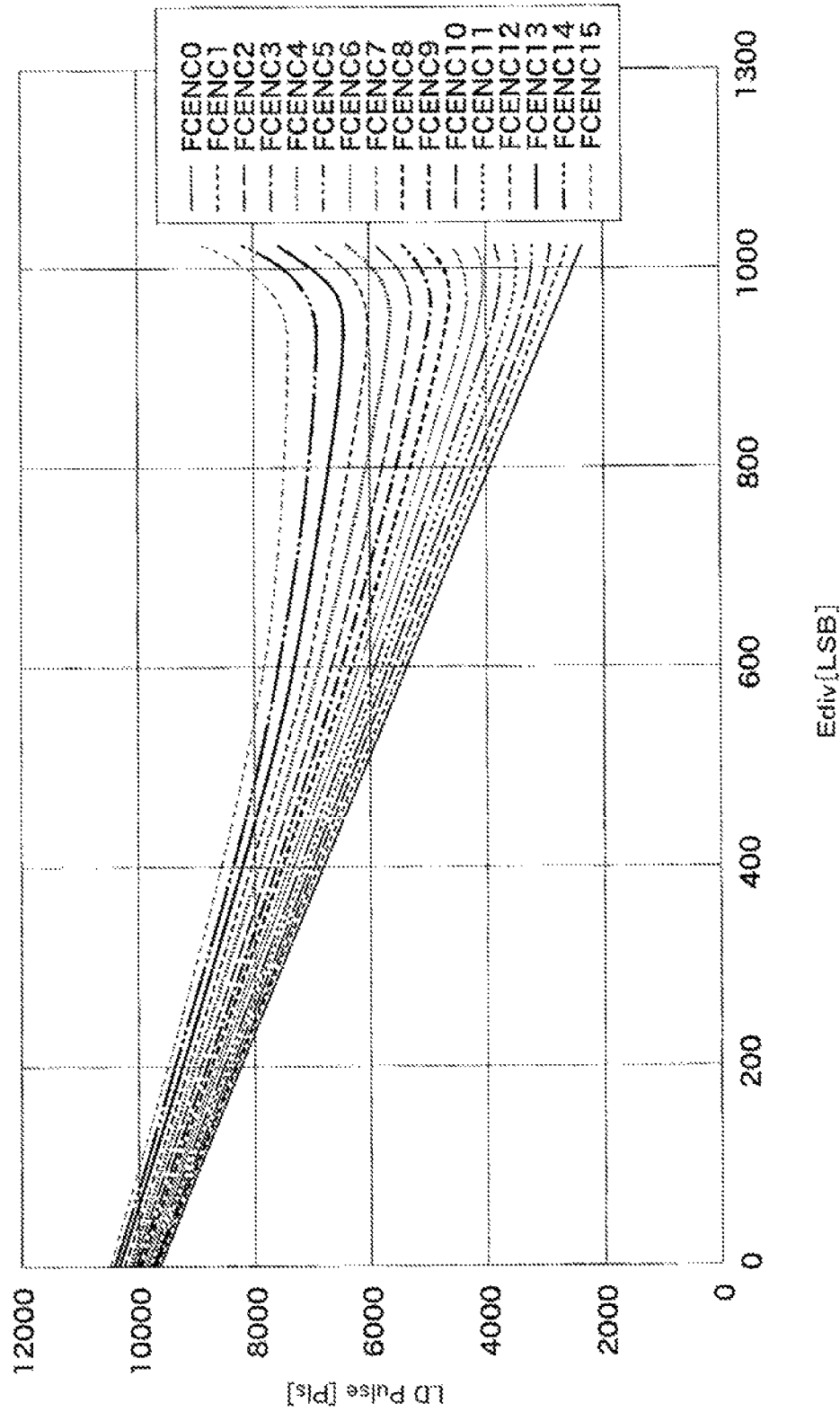
FIG. 7 is a graph showing a relationship between focal length and focus lens position (LDPls) for every subject distance, for the camera of one embodiment of the present invention.

FIG. 7 shows one example of trajectories at each subject distance (FCENC), when the horizontal axis is made zoom position (focal length) and the vertical axis is made LDPls. Specifically, FIG. 7 shows LDPls for each focal length for the same subject distance, which was shown in graph form in FIG. 6. With the example shown in FIG. 7, in the case of a zoom position (input value) of 800 Ediv and subject distance FCENC7, LDPls is about 5000. With this embodiment, zoom position is detected in 1024 divisions by the linear encoder ZM position detection section 82, and is displayed in Ediv units. FIG. 7 also shows examples of LDPls corresponding to FCENC0 (optical infinity) and LDPls corresponding to FCENC15 (optical close-up) varying in accordance with respective zoom position (focal length).

Returning to FIG. 6, focal length Z1 in FIG. 3-FIG. 5 corresponds to Trac-ZMENC-1 (n-1) in FIG. 6. Here, this focal length is made Trac-ZMENC value before update=ZmEnc_prev. Also, focal length Z2 in FIG. 3-FIG. 5 corresponds to Trac-ZMENC-k2 in FIG. 6. Here, this focal length is made current Trac-ZMENC value=ZmEnc_Now.

LDPls corresponding to position O2 in FIG. 3 is calculated from Pls (n-1:i) and Pls (n-1:i+2) using interpolation calculation. Also, LDPls corresponding to position O4 in FIG. 3 is calculated from Pls(k2:i-1) to Pls(k2:i+2) using interpolation calculation (Qy in FIG. 6). If LDPls corresponding to target position is calculated in this way, it is possible to carry out focus tracking towards this position by driving the focus lens 11b at maximum speed. This interpolation processing will be described later using FIG. 8.

In the case of the example shown in FIG. 3 and FIG. 5, LDPls of target position should be calculated using interpolation calculation from the table shown in FIG. 6, based on FCENC corresponding to the reciprocal of distance for target positions O4 and O5 (1/L) and Trac-ZMENC corresponding to focal length after a zoom operation.

Figure 8:
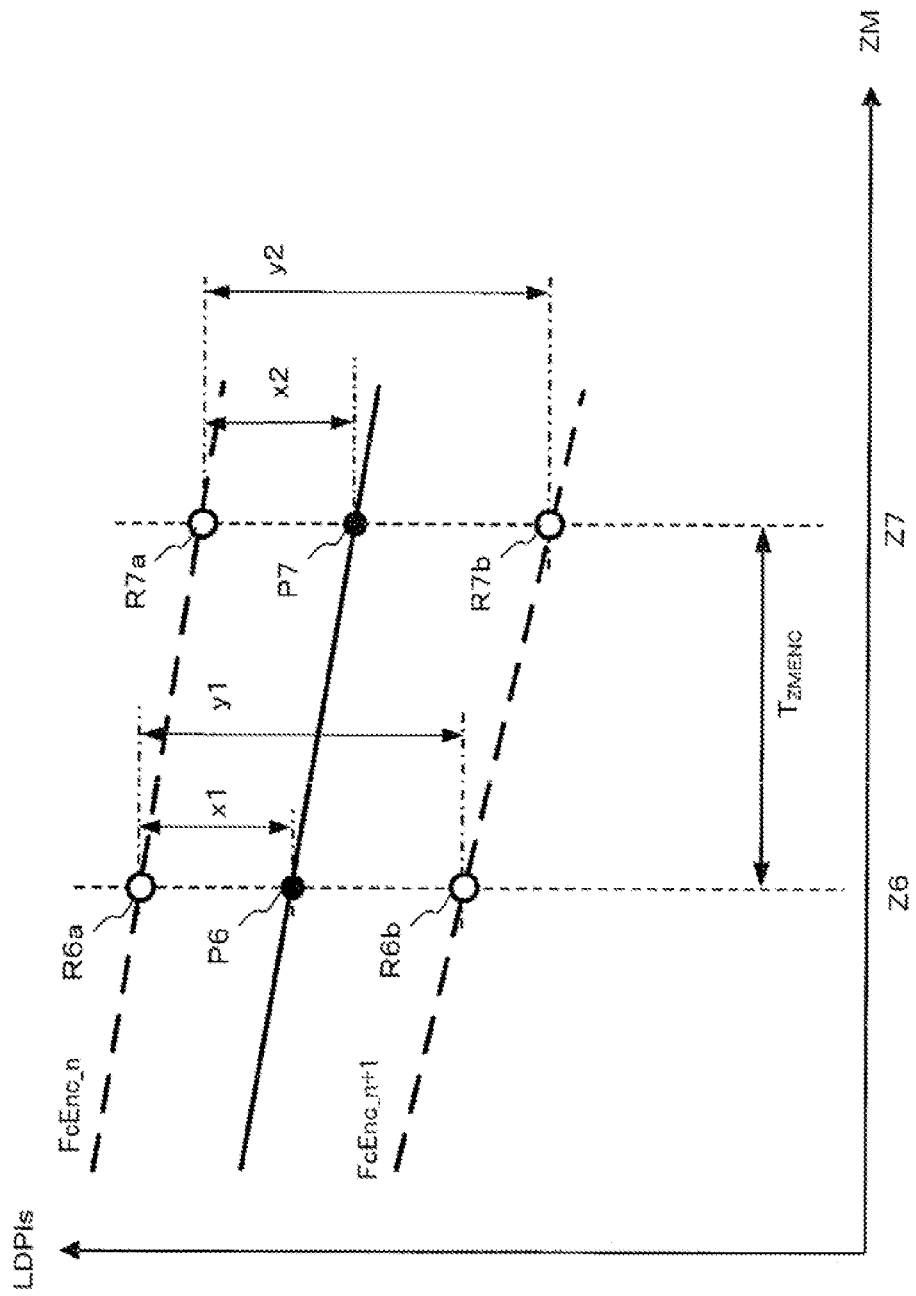
FIG. 8 is a drawing for describing calculation of focus tracking, in the camera of one embodiment of the present operation.

Next, tracking calculation at the time of a focus tracking operation will be described using FIG. 8. In FIG. 8, the horizontal axis represents focal length (ZM), and the vertical axis represents lens position of the focus lens 11b (LDPls). Also, LDPls positions corresponding to each of points R6a, R7a, R6b and R7b are stored in the table shown in FIG. 6 (Trac-ZMENC table), a line joining R6a and R7a is stored in column FCENCn, and a line joining R6b and R7b is stored in column FCENC n+1.

Before the occurrence of tracking due to a zoom operation, the focus lens 11b is being driven in either direction between the infinity end and the close up end by scan drive or absolute (focus) drive, or is stopped at a particular LD position. A zoom operation is performed from the state.

Focus tracking calculation is carried out in accordance with the following procedure.

(1) Position P6 (BasePls) for focal length Z6 (ZMENC_Prev) is Pls constituting a reference, a width y1 between position R6A (Base[n:m]Pls) and position R6b (Base]n+1:m]Pls) is made Range2 (m), a width x1 between position R6a and position P6 (BasePls)) is made Range1 (m), and the ratio of these two ranges is calculated as Target_Ratio. Here, width x1 can be calculated from Range1 (m)=BasePls-Base[n:m]Pls. Also, width y1 can be calculated from Range2 (m)=Base[n+1:m]Pls-Base[n:m]Pls. The ratio Target_Ratio can be calculated from Target_Ratio=Range1 (m)/Range2 (m).

(2) Position R7a (Base[n:m+1]Pls) and R7b (Base[n+1:m+1]Pls) are obtained from LDPls position being held in the Trac-ZMENC table for focal length Z7 (ZMEnc_Now), and range y2 between the two positions is calculated as Range2 (m+1). Here, range y2 can be calculated from Range2[m+1]=Base[n+1:m+1]Pls-Base[n:m+1]Pls.

TargetPls (x2 in FIG. 8) corresponding to position P7 is calculated using the calculated Target_Ratio and width Range2 (m+1). Here, TargetPls can be calculated from TargetPls=Range2 (m+1)×Target_Ratio.

(4) Tracking processing of the above-described steps (1) to (3) is updated every tracking update time $T_{ZMENC}$ (for example 1 ms), and continues until the user's zoom operation is completed.

In this way, with this embodiment LDPls for target position is calculated by repeating the focus tracking calculations as shown in FIG. 8 at update time intervals using the table shown in FIG. 6, and focus tracking focus tracking drive is carried out towards this position.

Next, commands transmitted from the camera body side to the interchangeable lens side will be described. In the event that an absolute drive command with ZMENC attached is transmitted from the camera body side, focus target position, and ZMENC information (focal length information) that was referenced by the body at the time of target position calculation are included in this command information. Also, in the event that a scan drive command with ZMENC attached is transmitted, focus target position, scan drive speed and ZMENC information (focal length information) that was referenced by the body at the time of target position calculation are contained in this command information.

Also, in order to make it possible to associate drive target position with zoom state, a parameter representing that it is absolute drive with ZMENC, scan drive with ZMENC, distance drive with ZMENC or defocus drive with ZMENC is transmitted from the camera body side to the lens side. In the case of electronic zoom (EZ) also, a parameter for associating with zoom state is similarly transmitted.

Further, for an asynchronous LD absolute drive command, a ZMENC value is transmitted in order to carry out positional control of the photographing lens taking into consideration the ZMENC value (focal length information). A flag representing lens state is also transmitted from the lens side in response to a request from the camera body, as described above. The focus tracking state flag is adopted as this flag representing lens state. After a lens state request command (AskStatusLv) has been received from the camera body, in the case of focus tracking 1 is set, while in the case where focus tracking is not performed the flag is reset to 0.

As described previously, with this embodiment, at the time of focus tracking drive is performed at maximum speed to the target position (position O2→O4 in FIG. 3, position O2→O5 in FIG. 4 and FIG. 5). The faster the speed at the time of focus tracking, the more quickly it is possible to carry out focus tracking, but as speed increased there is a tendency for drive noise to increase.

A speed limit parameter is therefore incorporated into the command. Two speed limits are provided, namely a maximum speed (Max speed) at the time of normal focus tracking, and a maximum speed (Max speed) at the time of focus tracking when a movie flag is set. Besides the two above described speed limits, maximum speed may differ in accordance with other conditions. Also, if there is no difference in drive noise with speed, the speed limit may be omitted, or the same maximum speed may be set as the speed limits.

Next, operation of the present embodiment when a zoom operation is carried out will be described using the timing charts of FIG. 9A and FIG. 9B. FIG. 9A shows the case where a zoom operation has been carried out while lens drive (absolute drive) for a focus operation is being carried out, while FIG. 9B shows the case where a zoom operation is carried out while scan drive is being carried out and tracking is completed before an absolute drive command with an updated target position. In this case, after completion of tracking, scan drive towards the initial scan drive target position (position O3 in FIG. 3) is restarted, and scan drive continues to a target position (position O5 in FIG. 5) that has been updated by an absolute drive command with an updated target position.

In FIG. 9A and FIG. 9B, a lens state acquisition command (AskStatusLV) is transmitted from the camera body side to the lens side at specified time intervals (with this embodiment once per one frame, with a frame rate of 240 fps), and at the lens side that has received this lens status command it is determined whether or not a zoom operation has been performed.

FIG. 9A illustrates a case where lens drive for focusing (absolute drive) is commenced at the point where time t76 has passed, and a zoom operation is carried out from time t92 to t96. If a zoom operation is performed, the CPU 41 within the interchangeable lens 100 commences tracking+target position drive, as was described in FIG. 5. Also, a flag indicating that focus tracking is being carried out (tracking state flag) is transmitted in accordance with the lens state (lens state acquisition command) from the camera body side.

At the camera body 100 side, if the detected state is tracking in progress, it is possible to transition to actual exposure even if lens drive is in progress. Specifically, since it is possible to predict lens drive time at the body side, it is possible to transition to actual exposure taking this time into consideration.

Also, FIG. 9B is an example where a zoom operation occurs while scan drive is in progress, tracking is commenced, and tracking is completed before an absolute drive command with an updated target position is transmitted. In this case, a zoom operation is performed from time t84 until t88, and in response to this zoom operation tracking is carried out, and after drive only to the extent of tracking, scan drive is immediately carried out. At this time, scan drive is recommenced towards the initial scan drive target position (position O3 in FIG. 3). Then, once the camera body size has transmitted an absolute drive command with an updated target position, the lens side continues with scan drive towards the updated target position (position O5 in FIG. 3). In the event that tracking has occurred while scan drive is in progress, the CPU 41 within the interchangeable lens 100 returns (transmits) a tracking state flag to the camera body side at least once. Even in the event that scan drive is commenced and completed between a synchronization signal and the next synchronization signal, the tracking state flag is returned.

Figure 14:
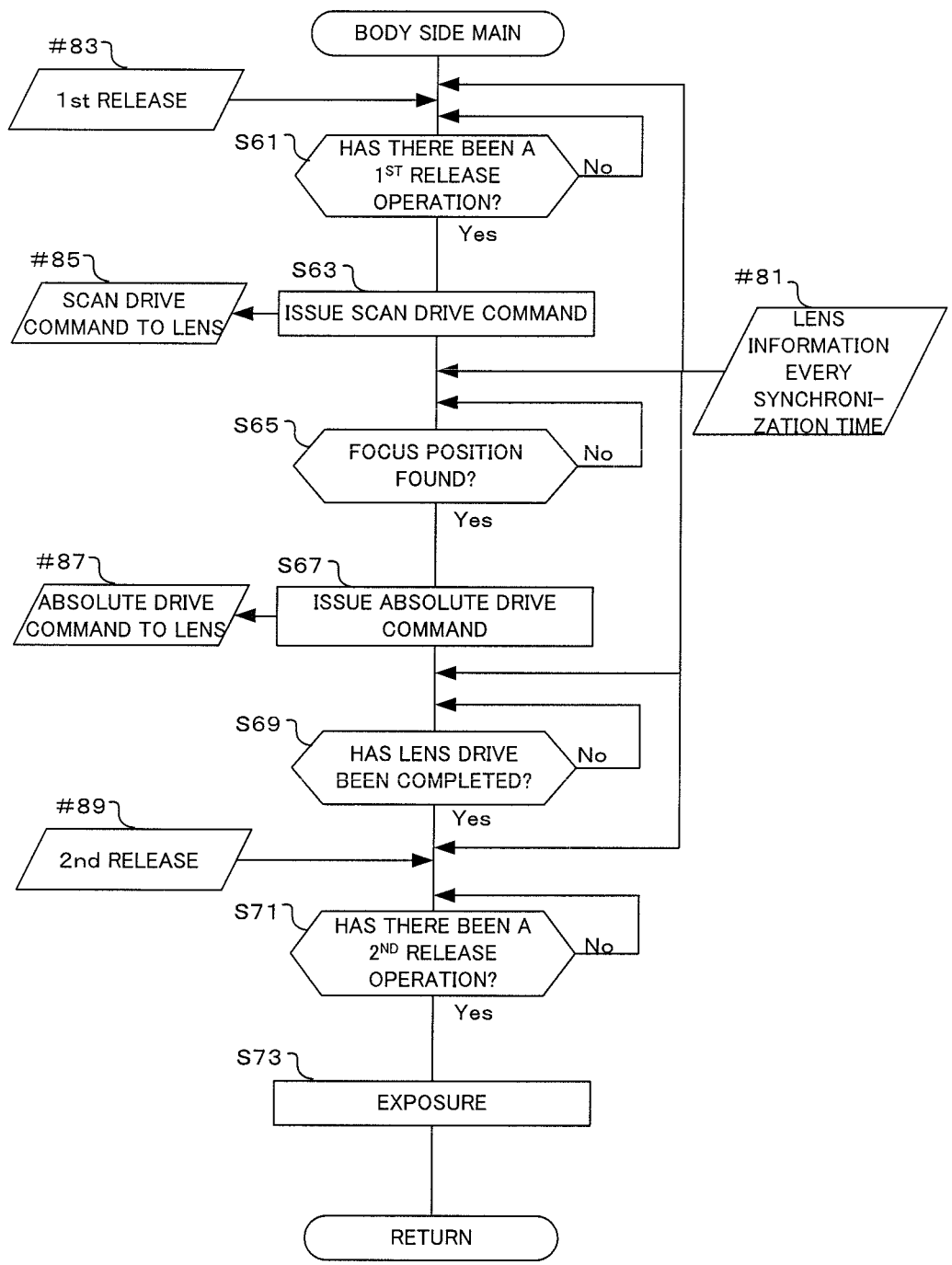
FIG. 14 is a flowchart showing main operation at the body side, for the camera of one embodiment of the present invention.

Next, operation of the camera of one embodiment of the present invention will be described using the flowcharts shown in FIG. 10 to FIG. 14. The processing flow shown in FIG. 10 to FIG. 13 is executed by the CPU 41 within the interchangeable lens 100 in accordance with a program stored in the storage section 37, while the processing flow shown in FIG. 14 is executed by the body control section 203 within the camera body 200 in accordance with the program stored in the body storage section 205.

If the lens side main flow shown in FIG. 10 is entered, it is first determined whether or not a command has been received from the body (S1). Since commands such as scan drive and absolute drive are transmitted from the camera body 200 to the interchangeable lens 100, in this step it is determined whether or not any command has been received. If the result of this determination is that a command has not been received, a standby state is entered.

If the result of determination in step S1 is that the command has been received from the body, it is determined whether or not the ZMENC detection time has elapsed (S3). This ZMENC detection time is $T_{ZMENC}$ that was shown in FIG. 8, and is a time interval for detecting zoom position.

If the result of determination in step S3 is that the ZMENC detection time has elapsed, ZMENC position update is carried out (S5). Here, the newest zoom, position is acquired from the zoom position detection section 34 (linear encoder ZM position detection section 82), and ZMENC is updated.

Once ZMENC position update has been carried out in step S5, or if the result of determination in S3 was that the ZMENC detection time had not elapsed, it is next determined whether or not a zoom operation has occurred (S7). Here, determination as to whether or not there has been a zoom operation is based on variation over time of zoom position that has been detected by the zoom position detection section 34.

If the result of determination in S7 is that a zoom operation has occurred, it is next determined whether or not it is a zoom operation during scan (S9). Scan drive is carried out by the interchangeable lens 100 in accordance with a command from the camera body 200. In this step it is determined whether or not the zoom operation occurred during this scan drive.

If the result of determination in step S9 is that the zoom is during scan, focus tracking during scan is carried out (S11). Here, target position is calculated from current position, as was described using FIG. 3 or FIG. 4. Detailed operation of this focus tracking during scan will be described later using FIG. 11.

On the other hand, if the result of determination in step S9 is that zoom was not during scan, focus tracking during absolute drive is carried out (S13). Here, target position is calculated from current position, as was described using FIG. 5. Detailed operation of this focus tracking during absolute drive will be described later using FIG. 12.

If focus tracking during scan has been carried out in step S11, or if focus tracking during absolute drive has been carried out in step S13, lens (LD) drive is next carried out (S15). Here, lens drive towards the target position is carried out in the case of focus tracking, and normal scan drive or absolute drive is carried out in the event that there is no zoom operation. Detailed operation of this LD drive will be described later using FIG. 13.

If LD drive has been carried out in step S15, it is next determined whether or not the target position has been reached (S17). Here, it is determined whether or not the result of LD drive is that a target position set by focus tracking, or a target position for normal scan drive or absolute drive etc. has been reached.

If the result of determination in step S17 is that the target position has not been reached, elapse of a synchronization time is awaited (S19). Since communication is carried out between the camera body 200 and the interchangeable lens 100 every time a synchronization signal is transmitted from the camera body 200 to the interchangeable lens 100, receipt of this synchronization signal is awaited. Once the synchronization signal has been received lens information is transmitted to the body at each synchronization signal (#21). As lane information, zoom operation state etc. is included, as described previously. Once synchronization time waiting has been carried out, processing returns to step S1.

If the result of determination in step S17 is that the target position has been reached, the processing flow shown in FIG. 10 is completed.

Next, operation of the focus tracking operation during scan of step S11 will be described using FIG. 11. If this flow is entered, first, current position at the time tracking occurs is made BasePls (S31). Here, as was described using FIG. 8, position of the focus lens 11b corresponding to position P6 is stored as BasePls (and corresponding to position O2 in FIG. 3).

Next, TargetPls is calculated from the Trac-ZMENC table (S33). Here, Target Pls (position O4 in FIG. 3) representing target position is calculated using the procedure that was explained using FIG. 8, using the Trac-ZMENC table shown in FIG. 6.

If TargetPls has been calculated, the target position is next updated to TargetPls (S35). Here, the lens CPU 41 sets drive target position for the focus lens 11b. As was described previously, with the LD drive of step S15, drive of the focus lens 11b towards this updated target position is carried out. If the target position as been updated this processing flow is completed, and the originating flow is returned to.

Next, operation of the focus tracking operation during absolute drive of step S13 will be described using FIG. 12. If this flow is entered, target position for absolute drive is first made BasePls (S41). Target position for absolute drive (refer to position O3 in FIG. 5) is transmitted from the camera body 100, and so here the received target position for absolute drive is stored as BasePls.

Next, TargetPls is calculated from the Trac-ZMENC table (S43). Here, Target Pls representing target position is calculated using the Trac-ZMENC table shown in FIG. 6 (refer to position O5 in FIG. 5).

If TargetPls has been calculated, the target position is next updated to TargetPls (S45). Here, the lens CPU 41 sets drive target position for the focus lens 11b. As was described previously, with the LD drive of step S15, drive of the focus lens 11b towards this updated target position is carried out. If the target position as been updated this processing flow is completed, and the originating flow is returned to.

Next, operation for LD drive of step S15 will be described using FIG. 13. If this flow is entered, it is first determined whether or not target position update has occurred (S51). As was described previously, steps S35 and S45 are for a case where an update to target position has been performed. In this step it is determined whether or not these target position updates have been performed. If the result of determination in step S51 is that an update to target position has occurred, target position update is carried out (S53).

If the target position update has been carried out in step S53, or if the result of determination in step S51 was that a target position update was not performed, then next the focus lens is driven (S55). Here, the lens CPU 41 drives the focus lens 11b towards the set target position using the focus lens drive mechanism 25 (LDMT 73). If drive of the focus lens 11b has been carried out, the originating processing flow is returned to. If the target position is reached, drive is halted in accordance with the result of determination in step S17 (refer to FIG. 10).

Next, body side main operation will be described using the flowchart shown in FIG. 14. In the flow shown in FIG. 14, lens information is transmitted from the interchangeable lens 100 to the camera body 200 every synchronization time (#81).

If the flow shown in FIG. 14 is entered, it is first determined whether or not there has been a 1st release operation (S61). Here determination is based on whether or not a first release has been turned on as a result of a release button arranged on the camera body 100 being pressed down half way. If a first release operation has been performed (refer to #83), the result of determination in step S61 is made Yes.

If the result of determination in step S61 is that a 1st release operation has been performed, next a scan drive command is issued (transmitted) (S63). Here, in order to carry out automatic focus adjustment using contrast AF, a scan drive command is transmitted to the lens CPU 41 so as to carry out scan drive for the interchangeable lens 100.

If the scan drive command has been issued (transmitted), it is next determined whether a focus position has been found (S65). The body control section 203 of the camera body 200 detects peak position of a contrast signal (AF evaluation signal) based on an image signal acquired from the image sensor 201 during scan drive of the focus lens 11b. In this step it is determined whether or not it was possible to detect a peak position corresponding to focus position.

If the result of determination in step S65 is that a focus position has been found, an absolute drive command is issued (transmitted) (S67). In step S65, since a focus position was found, an absolute drive command is transmitted to the lens CPU 41 to drive the focus lens 11b to an absolute position corresponding to this focus position (refer to #87).

If an absolute drive command has been issued (transmitted), it is next determined whether or not lens drive has been completed (S69). The lens CPU 41 of the interchangeable lens 100 transmits lens information such as lens drive complete to the body control section 203 of the camera body 200 every synchronization time (refer to #21 in FIG. 10), and so in this step is determined whether or not lens drive complete information has been received from the lens side.

If the result of determination in step S69 is that lens drive is complete, it is next determined whether or not there has been a 2nd release operation (S71). Here determination is based on whether or not a 2nd release has been turned on as a result of the release button arranged on the camera body 100 being pressed down fully. If a 2nd release operation has been performed (refer to #89), the result of determination in step S71 is made Yes.

If the result of determination in step S71 is that there is a second release operation, exposure is carried out (S73). Here, the image sensor 201 is exposed for an appropriate exposure time by a shutter, to acquire image data. Image data that has been acquired here is stored in a storage medium etc. after having been subjected to image processing. Once exposure is completed, the body side main operation is completed.

As has been described above, one embodiment of the present invention comprises a zoom position detection section 34 for detecting zoom position in accordance with focal length of an imaging optical system, and a lens control section (CPU 41 etc.) for controlling movement of a focus lens 11b contained in the imaging optical system, and the lens control section corrects position that the focus lens is to be moved to in accordance with zoom position before movement of the focus lens 11b, and zoom position while the focus lens 11b is being moved (refer to FIG. 3-FIG. 5, S11 and S13 in FIG. 10, etc.). As a result, it becomes possible to carry out a high-speed AF operation even if a zoom operation is performed during the AF operation.

Specifically, with the photographing lens disclosed in patent publication 1 above, if the zoom operation is performed during an AF operation, the AF operation is interrupted, and a tracking operation is carried out in accordance with the zoom position, and after completion of the tracking operation an AF operation is performed again from the start, which results in a time lag occurring. However, with the one embodiment of the present invention, since the position that the focus lens is moved to is corrected in accordance with zoom position before movement of the focus lens 11b and zoom position during movement of the focus lens 11b, it is possible to carry out a high-speed AF operation.

Also, with the one embodiment of the present invention it is possible to move the focus lens 11b at a number of speeds, and when correcting position that the focus lens 11 is moved to in accordance with zoom position before movement of the focus lens (for example, focal length Z1 in FIG. 3) and zoom position during movement of the focus lens 11, the focus lens is moved at the fastest speed (for example, from position O2 to position O4 in FIG. 3). As a result, focus tracking allows movement at the fastest speed, and it is possible to perform scan drive at a normal speed, and it is possible to carry out a high-speed AF operation.

Also, with the one embodiment of the present invention, when correcting the position that the focus lens 11$b$ is moved to, the position is corrected while continuously moving the focus lens 11$b$ without halting (for example, there is a transition to scan drive without temporarily halting at position O4 in FIG. 3). As a result is possible to carry out a high-speed AF operation.

Also, with the one embodiment of the present invention, when the position that the focus lens 11$b$ is moved to is corrected by the lens control section while a scan operation is being executed, the scan operation is halted and the focus lens 11$b$ is moved to the corrected position, and after movement is completed the scan operation is recommenced (for example, if it is determined in S9 of FIG. 10 that scan is in progress, the scan operation is halted, and after carrying out the focus tracking of S11 the scan operation is recommenced). As a result, it is possible to carry out a high-speed AF operation even if a zoom operation is performed during the scan operation.

Also, with the one embodiment of the present invention, the body control section 203 transmits a stored zoom position that has been stored in the zoom position storage section (for example, the body storage section 205) to the lens control section, and corrects position that the focus lens is moved to in accordance with the stored zoom position and zoom position during movement of the focus lens 11$b$ (for example, refer to FIG. 8).

With the one embodiment of the present invention, a device for taking pictures has been described using a digital camera, but as a camera it is also possible to use a digital single lens reflex camera or a compact digital camera, or a camera for movie use such as a video camera, and further to have a camera that is incorporated into a mobile phone, a mobile information terminal (PDA: Personal Digital Assistant), game console etc. In any event, it is possible to adopt the present invention as long as a device is capable of shooting with a zoom operation.

Also, among the technology that has been described in this specification, with respect to control that has been described mainly using flowcharts, there are many instances where setting is possible using programs, and such programs may be held in a storage medium or storage section. The manner of storing the programs in the storage medium or storage section may be to store at the time of manufacture, or by using a distributed storage medium, or they be downloaded via the Internet.

Also, regarding the operation flow in the patent claims, the specification and the drawings, for the sake of convenience description has been given using words representing sequence, such as "first" and "next", but at places where it is not particularly described, this does not mean that implementation must be in this order.

The present invention is not limited to these embodiments, and structural elements may be modified in actual implementation within the scope of the gist of the embodiments. It is also possible form various inventions by suitably combining the plurality structural elements disclosed in the above described embodiments. For example, it is possible to omit some of the structural elements shown in the embodiments. It is also possible to suitably combine structural elements from different embodiments.

What is claimed is:

1. An imaging device, comprising an interchangeable lens having a photographing optical system whose focal length can be varied, comprising:
   a zoom position detection section for detecting zoom position in accordance with focal length of the imaging optical system; and
   a lens control section for controlling movement of a focus lens contained in the imaging optical system, wherein
   the lens control section corrects position that the focus lens is to be moved to in accordance with zoom position before movement of the focus lens, and zoom position during movement of the focus lens.

2. The imaging device of claim 1, wherein:
   the lens control section is capable of moving the focus lens at a number of speeds, and when correcting position that the focus lens is to be moved to in accordance with zoom position before movement of the focus lens, and zoom position during movement of the focus lens, moves the focus lens at a maximum speed.

3. The imaging device of claim 1, wherein:
   the lens control section, when correcting position the focus lens is moved to, corrects position by continuously moving the focus lens without stopping.

4. The imaging device of claim 1, further comprising:
   a storage section for storing tracking information representing a relationship between the zoom position and the focus lens position at which a specified distance is focused on, wherein
   the lens control section calculates a second position based on the tracking information.

5. An imaging device comprising an interchangeable lens having a photographing optical system whose focal length can be varied, comprising:
   an imaging section for imaging light flux that has passed through the imaging optical system and outputting image signals;
   a zoom position detection section for detecting zoom position in accordance with focal length of the imaging optical system;
   a lens control section for controlling movement of a focus lens contained in the imaging optical system; and
   an AF control section for carrying out a scan operation in order to detect peak position of contrast based on image signals output by the imaging section, while moving the focus lens using the lens control section, wherein
   the lens control section halts the scan operation in the event that variation in the zoom position has been detected during execution of the scan operation in accordance with an instruction from the AF control section, calculates a corrected position of the focus lens based on the focus lens position at the time of detection of variation in zoom position and zoom position detected during movement of the focus lens, moves the focus lens to the corrected position, and, after this movement has been completed, recommences the scan operation.

6. The imaging device of claim 5, wherein:
   the lens control section is capable of moving the focus lens at a number of speeds, and when moving the focus lens to the corrected position, moves the focus lens at the fastest speed among the number of speeds.

7. The imaging device of claim 5, further comprising:
a storage section for storing tracking information representing a relationship between the zoom position and the focus lens position at which a specified distance is focused on, wherein
the lens control section calculates the corrected position based on the tracking information.

8. The imaging device of claim 7, wherein:
the lens control section carries out an operation to move the focus lens to a first target position using a scan operation, calculates a second target position based on zoom position detected while the focus lenses being moved, the first target position, and the tracking information, and moves the focus lens to the second target position once the scan operation is recommenced.

9. The imaging device of claim 8, wherein:
the lens control section continuously moves the focus lens without stopping movement, when the scan operation is recommenced.

10. A camera system, comprising an interchangeable lens having a photographing optical system whose focal length can be varied, and a camera body to which the interchangeable lens can be attached or detached, wherein
the interchangeable lens comprises
a zoom position detection section for detecting zoom position in accordance with focal length of the imaging optical system; and
a lens control section for controlling movement of a focus lens contained in the imaging optical system,
and the camera body comprises
a body control section for carrying out communication with the lens control section, and
a zoom position storage section for storing the zoom position that has been transmitted by the lens control section and received by the body control section,
wherein
the body control section transmits a stored zoom position that is stored in the zoom position storage section to the lens control section, and
the lens control section corrects position that the focus lens is to be moved to in accordance with the stored zoom position, and zoom position during movement of the focus lens.

11. The camera system of claim 10, wherein:
the lens control section is capable of moving the focus lens at a number of speeds, and when correcting position that the focus lens is to be moved to in accordance with the stored zoom position and the zoom position during movement of the focus lens, moves the focus lens at a maximum speed among the number of speeds.

12. The camera system of claim 10, wherein:
the lens control section corrects position that the focus lens is moved to in the case where the stored zoom position that has been transmitted from the body control section and received, and a zoom position output by the zoom position detection section, are different.

13. The camera system of claim 10, wherein:
the interchangeable lens has a storage section for storing tracking information, which is a relationship between the focus lens position corresponding to a specified distance, and the zoom position, and
the lens control section corrects position that the focus lens is moved to based on the tracking information.

14. The camera system of claim 13, wherein:
the lens control section, when moving the focus lens to a first position, corrects the position the focus lens is moved to based on a detected zoom position, the first position, and the tracking information.

15. A control method for an imaging device including a focus lens having an imaging optical system whose focal length can be varied, comprising:
halting execution of first processing to move the focus lens to a first position, during execution of the first processing, when variation in the focal length is detected, and executing second processing to calculate a second position of the focus lens based on focal length detected during movement of the focus lens to the first position, and move the focus lens to the second position.

16. The control method for an imaging device of claim 15, wherein:
it is possible to move the focus lens at a number of speeds, and when executing the second processing, the focus lens is moved at the fastest speed among the number of speeds.

17. The control method for an imaging device of claim 15, wherein:
when stopping the first processing and executing the second processing, the focus lens is moved continuously stopping movement.

18. The control method for an imaging device of claim 15, wherein:
the second position is calculated based on tracking information, which is a relationship between the focal length and the focus lens position at which a specified distance is focused on.

* * * * *